United States Patent [19]

Persyk et al.

[11] Patent Number: 4,663,187
[45] Date of Patent: May 5, 1987

[54] SCINTILLATION CRYSTAL AND METHOD OF MAKING IT

[75] Inventors: Dennis E. Persyk, Barrington; Everett W. Stoub, Villa Park, both of Ill.

[73] Assignee: Siemens Gammasonics, Inc., Des Plaines, Ill.

[21] Appl. No.: 667,304

[22] Filed: Nov. 1, 1984

[51] Int. Cl.[4] .......................... C01B 9/00; B05B 5/00; B05D 5/06; B05D 5/12
[52] U.S. Cl. .................................... 427/65; 423/463; 427/157; 427/160; 427/164
[58] Field of Search ................. 427/65, 157, 160, 164; 423/463

[56] References Cited

U.S. PATENT DOCUMENTS

| Re. 30,156 | 11/1979 | Brinckmann | 252/301.4 H |
|---|---|---|---|
| 2,149,076 | 2/1939 | Stockbarger | 23/88 |
| 3,693,018 | 9/1972 | Spicer | 250/213 |
| 3,795,531 | 12/1966 | Spicer | 117/33.5 C |
| 3,961,182 | 6/1976 | Spicer | 250/213 VT |
| 4,044,082 | 8/1977 | Rosette | 264/1 |
| 4,287,230 | 9/1981 | Galves et al. | 427/65 |
| 4,313,257 | 2/1982 | Woodbury et al. | 29/592 R |

OTHER PUBLICATIONS

Preparation of Self-Supporting Large-Area Polycrystalline Structures of CsI(Na) by Evaporation: W. Schubert; Siemens Forsch u. Entwickl. Ber., vol. 3, No. 2, (1974), pp. 100-102.
Ser. No. 450,481, now abandoned; Persyk.

Primary Examiner—James R. Hoffman
Attorney, Agent, or Firm—Mark H. Jay

[57] ABSTRACT

A thick layer of CsI(Na) is heated to or slightly below its melting point. The CsI(Na) is held at that temperature for 7 to 10 hours and is cooled to room temperature, preferably in two steps. The resulting scintillation crystal is translucent or transparent.

18 Claims, 2 Drawing Figures

SCINTILLATION CRYSTAL AND METHOD OF MAKING IT

BACKGROUND OF THE INVENTION

The invention relates to scintillation crystals. (The term "crystal" includes bodies which are used as scintillators; such bodies may be single crystal, polycrystalline, amorphous, etc.) More particularly, the invention relates to thick scintillation crystals, i.e. crystals which are sufficiently thick that a large fraction of radiation incident on the crystal loses all its energy in the crystal as a result of interactions with it. In practice, thick scintillation crystals are at least ¼ to ⅜ inch thick when used in gamma cameras, and may be several inches thick when used for oil well logging, background monitoring, and other applications. Thin scintillation crystals have thicknesses on the order of hundreds of microns and are used for example in X-ray equipment.

Thick scintillation crystals are traditionally grown as large single crystals. This is slow and expensive. Furthermore, the growth process requires large and expensive furnaces, and substantial machining is required to cut and polish the rough scintillation crystal into an appropriate form for mounting and encapsulation.

Thick scintillation crystals have also been produced by evaporation of CsI(Na). The end product of this manufacturing process is a thick crystal with a needle-like polycrystalline structure. Crystals so produced are unusable for applications in which the incident radiation is gamma rays, because the crystals are not clear enough, have poor conversion efficiency, and poor energy resolution.

For applications requiring very thick crystals, optical clarity is an important characteristic, because the clearer is a scintillation crystal, the less attenuated is the scintillation light generated in it. To produce thick scintillation crystals with the required optical clarity, conventionally grown scintillation crystals have been required. This is highly expensive.

One object of the invention is to produce a thick scintillation crystal without requiring the large and expensive furnaces needed to produce grown crystals.

A further object is to provide a thick scintillation crystal which is optically clear enough for use in applications such as oil-well logging, etc.

Yet a further object is to provide a thick scintillation crystal which can be produced more cost effectively than known thick scintillation crystals.

Yet still another object is in general to improve over the prior art.

SUMMARY OF THE INVENTION

In accordance with the invention, scintillation material is heated either close to or at its melting point for between 4 and 10 hours. Thereafter, the material is cooled to room temperature. Advantageously, the cooling is in two steps, the first being to cool the crystal to a temperature of about 400° C. at one predetermined rate, and the second being to cool the crystal down to room temperature at another faster rate.

In one advantageous embodiment, the material is maintained slightly below its melting point. This produces an optically translucent scintillation crystal having a crystal structure in which there are many optically visible irregularly shaped domains, i.e. irregularlly shaped domains which can be visually perceived with the unaided eye. The crystal is ready for encapsulation after it has been cooled down.

In a second advantageous embodiment, the scintillation material is actually melted and held at its melting point. This produces an optically transparent crystal with an amorphous crystal structure. The crystal so produced has a meniscus at its edge; the meniscus should be ground off before the crystal can be used.

In accordance with the invention, there is produced a new thick scintillation crystal.

The invention will be better understood with reference to the following drawing and the detailed description of preferred embodiments.

BRIEF DESCRIPTION OF THE DRAWING

Exemplary and non-limiting preferred embodiments of the invention are shown in the drawings, in which.

DETAILED DESCRIPTION OF PREFERRED EMBODIMENTS

Figure 1:
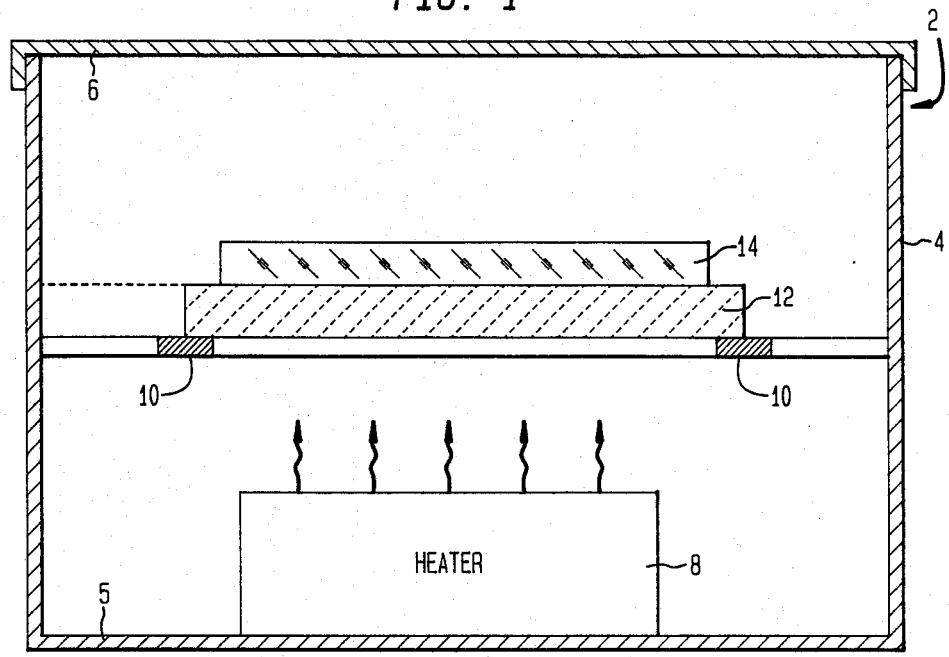
FIG. 1 is a schematic cross-sectional drawing of apparatus in accordance with the invention.

An oven generally indicated by reference numeral 2 has an insulated housing 4, a bottom 5, and a cover 6. Inside the oven 2 is a heater 8 which is controlled by appropriate external circuitry (not shown). The heater 8 is preferably electrical, but this is not part of the invention.

A horizontal support 10 with an open center is located inside the oven 2 above the heater 8. In this example, the housing 4 is cylindrical so the support 10 is annular, but the shapes of the support 10 and housing 4 are not part of the invention. A substrate 12 is placed on top of the support 10. Suitable materials for the substrate 12 include quartz, high purity $Al_2O_3$, aluminum, Pyrex glass, lime glass or borosilicate glass, but other materials may be utilized. If the finished scintillation crystal described below is to be fixed to this substrate (as for use in a gamma camera) the substrate 12 must be of a material which is transparent to gamma radiation.

A layer 14 of scintillation material such as CsI(Na) is placed on top of the substrate 12. The layer 14 may be produced in a separate vacuum evaporation oven (not shown) and then laid on the substrate 12, or may merely be raw scintillation material in powdered form. Alternatively, the layer 14 may be produced in a vacuum evaporator which contains an appropriate heating means such as oven 2. It is advantageous if the oven 2 is provided with appropriate evaporation equipment because this reduces handling, but this is not part of the invention. The interior of the oven 2 is filled with argon or other nonreactive gas having a low continuous flow. This keeps oxygen out of the oven 2.

In accordance with the invention, the layer 14 of scintillation material is heated and then cooled down to room temperature. Three preferred examples are set forth below:

EXAMPLE I

A thick uniform layer 14 of CsI(Na) scintillation material produced by evaporation and having the characteristic needle-like crystal structure is heated in a uniform manner (i.e. in an environment containing the minimum feasable temperature gradient) from room temperature to approximately 617° C. (i.e. to within approximately 5° C. of its melting point of 622° C.). This heating step is carried out linearly over a period of between 2 and 6 hours, 4 hours being presently preferred.

After the layer 14 has been heated to the desired temperature, it is held at that temperature for between approximately 4 and 10 hours. The lower the temperature to which the layer 14 is heated, the longer must the layer 14 be so held. If the layer 14 is kept at the desired temperature for too long, the sodium in the scintillation material might evaporate, because of its vapor pressure.

After the layer 14 has been heated for an appropriate period, it is cooled down linearly to approximately 400° C. over approximately 8 hours. Thereafter, it is cooled down to room temperature. This final cooling step is preferably carried out linearly over 4 hours, but this is non-critical. It is not necessary that cooling be carried out in two steps, but this is preferred because this reduces the time required for cooling. The cooler the crystal, the faster the rate at which it can be cooled down without breaking; the second cooling step therefore proceeds more rapidly than does the first.

Figure 2:
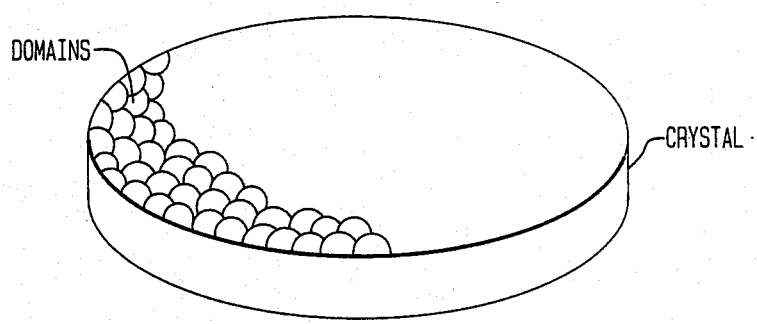
FIG. 2 schematically illustrates the appearance of a preferred embodiment.

The cooled layer 14 of CsI(Na) is a thick scintillation crystal of uniform thickness, characterized by many small optically visible (i.e. as by visuall perception with the unaided eye) domains having irregular shapes. Each domain has a diameter which at most approximates the thickness of the layer 14 (see FIG. 2). The diameters increase with the temperature to which the layer 14 is heated and the length of time during which heating is carried out. The crystal is optically translucent, has a conversion efficiency of approximately 90%, and an energy resolution of approximately 12% for 122 keV gamma radiation.

EXAMPLE II

A dish-shaped substrate 12 made of thin (approximately 1 mm) Pyrex glass is used to support a thick uniform layer 14 of CsI(Na) scintillation material produced by evaporation and having the characteristic needle-like crystal structure. The layer 14 is uniformly heated to its melting point of 622° C. at the same rate as in Example I above and held in its liquid state for between 4 and 10 hours. The layer 14 is then cooled in the two steps described in Example I above.

The scintillation material in the layer 14 has a different coefficient of expansion than does the Pyrex dish used as the substrate 12. When cooled as set forth above, either the substrate 12 or the layer 14 (preferably the substrate 12) cracks and the finished thick scintillation crystal may be separated from the Pyrex substrate 12.

The finished scintillation crystal is optically transparent and has an amorphous crystal structure. The conversion efficiency is approximately 60–70% and the energy resolution is approximately 13% for 122 keV gamma radiation.

In some cases, it is desirable for the finished thick scintillation crystal to be uniformly (i.e. gaplessly) bonded to a substrate. To achieve this objective, a thicker and/or stronger substrate 12 is used and the cooling process is carried out more slowly for a longer time, such as 16 hours. The CsI(Na) is somewhat rubbery and accommodates itself to the stresses of cooling and generally no breakage occurs.

Because the scintillation material in the layer 14 is liquified during melting, a meniscus remains upon cooling on the upper periphery of the layer 14 and this should be removed (as by grinding) prior to use of the finished scintillation crystal.

EXAMPLE III

A mixture of CsI and NaI powders of appropriate proportions (in the range of 0.040 mole percent Na to 0.220 mole percent Na) is placed in the dish-shaped substrate of Example II above. This mixture is of sufficient depth to create a thick layer 14.

The mixture is uniformly heated and cooled as in Example II above. The finished thick scintillation crystal is optically transparent, has an amorphus crystal structure, a conversion efficiency of 60%–85% and an energy resolution of 13% for 122 keV gamma radiation. There is a meniscus which should be removed, as in Example II above.

In general, where very thick scintillation crystals are required, the scintillation material will be melted, because optical clarity becomes more important to performance in thicker crystals. Where the crystals are thinner, the scintillation material will not be melted, because the conversion efficiency and energy resolution are better where melting has not taken place.

The invention is not restricted to any particular scintillation material, CsI(Na) being only preferred. NaI(T1) may be used as the scintillation material, as may any other appropriate compound.

Those skilled in the art will understand that changes can be made in the preferred embodiments here described, and that these embodiments can be used for other purposes. Such changes and uses are within the scope of the invention, which is limited only by the claims which follow.

What is claimed is:

1. An optically translucent scintillation crystal having a structure characterized by a plurality of optically visible irregular domains.

2. An optically transparent scintillation crystal having an amorphous structure.

3. An optically translucent crystal of CsI(Na) having a structure characterized by a plurality of optically visible irregular domains.

4. An optically transparent crystal of CsI(Na) having an amorphous structure.

5. The crystal of claims 1, 2, 3 or 4, wherein the crystal is thick.

6. A method of making a thick scintillation crystal, comprising the steps of:
    forming a thick layer of a meltable scintillation material;
    heating said layer to a temperature almost as high as the melting point of said material;
    maintaining said layer at said temperature for between approximately 4 and 10 hours; and cooling said layer to room temperature.

7. The method of claim 6, wherein said material is CsI(Na).

8. The method of claim 7, wherein said temperature is approximately 617° C.

9. The method of claim 6, wherein said forming step is carried out by evaporation.

10. The method of claim 6, wherein said cooling step comprises the steps of cooling the layer to approximately 400° C. at a first rate and subsequently cooling the layer to room temperature at a second and faster rate.

11. A method of making a thick scintillation crystal, comprising the steps of:

forming a thick layer of a meltable scintillation material;

heating said layer to its melting point;

maintaining said layer at said melting point for between approximately 4 and 10 hours; and cooling said layer to room temperature.

12. The method of claim 11, wherein the material is CsI(Na).

13. The method of claim 11, wherein said forming step is carried out by evaporation.

14. The method of claims 9 or 13, wherein said forming step is carried out by vacuum evaporation.

15. The method of claim 11, wherein said forming step is carried out by laying down a layer of powder which includes CsI and NaI mixed together.

16. The method of claim 11, wherein said cooling step comprises the steps of cooling the layer to approximately 400° C. at a first rate and subsequently cooling the layer to room temperature at a second and faster rate.

17. The method of claim 11, wherein said material is held in a frangible vessel and said cooling step is carried out in a manner that a likelihood of breakage of the vessel is maximized.

18. The method of claim 11, wherein said material is laid on a substrate and said cooling step is carried out in a manner that said material is uniformly bonded to said substrate.

* * * * *